United States Patent
Oury et al.

(10) Patent No.: US 8,364,322 B2
(45) Date of Patent: Jan. 29, 2013

(54) METHOD AND SYSTEM OF REAL TIME MANAGEMENT AND MODULATION OF ELECTRICITY CONSUMPTION

(75) Inventors: Jean-Marc Oury, Paris (FR); Bruno Heintz, Paris (FR)

(73) Assignee: Voltalis SA, Paris (FR)

(*) Notice: Subject to any disclaimer, the term of this patent is extended or adjusted under 35 U.S.C. 154(b) by 789 days.

(21) Appl. No.: 12/309,502

(22) PCT Filed: Jul. 30, 2007

(86) PCT No.: PCT/FR2007/001317
§ 371 (c)(1),
(2), (4) Date: Oct. 2, 2009

(87) PCT Pub. No.: WO2008/017754
PCT Pub. Date: Feb. 14, 2008

(65) Prior Publication Data
US 2010/0030391 A1    Feb. 4, 2010

(30) Foreign Application Priority Data
Jul. 31, 2006 (FR) ..................... 06 06994

(51) Int. Cl.
*G05D 11/00* (2006.01)
(52) U.S. Cl. ............... 700/286; 700/22; 307/11
(58) Field of Classification Search ........... 700/286, 700/291, 22; 307/11
See application file for complete search history.

(56) References Cited

U.S. PATENT DOCUMENTS

| | | | |
|---|---|---|---|
| 5,796,628 A | 8/1998 | Chiang et al. | 700/295 |
| 6,785,592 B1 | 8/2004 | Smith et al. | |
| 6,868,293 B1* | 3/2005 | Schurr et al. | 700/22 |
| 7,313,465 B1* | 12/2007 | O'Donnell | 700/291 |
| 2004/0174071 A1* | 9/2004 | Nierlich et al. | 307/11 |
| 2005/0043860 A1* | 2/2005 | Petite | 700/291 |
| 2006/0178762 A1* | 8/2006 | Wroblewski et al. | 700/30 |
| 2007/0213876 A1* | 9/2007 | Warren et al. | 700/276 |

FOREIGN PATENT DOCUMENTS

| | | |
|---|---|---|
| EP | 1372238 | 12/2003 |
| WO | 0207365 | 1/2002 |
| WO | 03025701 | 3/2003 |
| WO | 03055031 | 7/2003 |
| WO | 03084022 | 10/2003 |
| WO | 03090038 | 10/2003 |
| WO | 2005029243 | 3/2005 |

OTHER PUBLICATIONS

International Search Report dated Jan. 2, 2008.
PCT Opionon, dated Dec. 10, 2008.

* cited by examiner

*Primary Examiner* — Mohammad Ali
*Assistant Examiner* — Anthony Whittington
(74) *Attorney, Agent, or Firm* — Sofer & Haroun, LLP

(57) ABSTRACT

A method of managing and modulating in real time the electrical consumption of a set of consumers, includes measurement in real time of the electrical consumption of a plurality of targeted sets of electrical equipment in operation, each set of equipment being situated in the home of a consumer, the measurement of the consumption of such equipment being performed by means of an electrical regulation module situated in the home of the consumer. The consumption measurements are transmitted by the modules to a central server. If a global setpoint, at a given moment, indicates that a certain total power should be cancelled, sending by the server, to certain of the modules, the instruction to selectively and temporarily cut the electrical power supply to the electrical equipment. Instruction sent by the server are received and executed by these modules.

10 Claims, 2 Drawing Sheets

METHOD AND SYSTEM OF REAL TIME MANAGEMENT AND MODULATION OF ELECTRICITY CONSUMPTION

RELATED APPLICATIONS:

This application is a National Phase application of PCT/FR2007/001317, filed on Jul. 30, 2007, which in turn claims the benefit of priority from French Patent Application No. 06 06994, filed on Jul. 31, 2006, the entirety of which is incorporated herein by reference.

FIELD OF THE INVENTION:

The invention relates to a method of managing and modulating in real time electrical consumption of a set of consumers, and a system specially suited to such a method.

The invention deals more specifically with the issue of measuring, monitoring and regulating the electrical power consumed by a plurality of consumers, in order to reduce it by a level that has been predetermined.

BACKROUND

The expression "set of consumers" should be understood to mean several thousands or hundreds of thousands of consumer sites scattered over a wide area.

The technical problem of the balance between electrical production and consumption is an ongoing problem because of the consumption variations and the impossibility of storing electrical energy. This constraint demands that electricity producers should be able to have means of adjusting the production at any moment and not only in peak consumption periods.

Already known, from the document EP 1 548 451, is a system of remotely reading and managing the electrical consumption, intended to monitor the energy consumption of a large number of users. This system is arranged to guarantee continual operation of all of the network, notably taking into account the risks of general outage due to overconsumptions. To this end, this system provides for being able to modify the data transmitted to an electricity meter, in order to locally and temporarily reduce the energy consumption of the set of appliances associated with this meter.

However, this system does not provide the possibility of finely and in real time modulating the electrical consumption of a targeted set of electrical equipment situated in the home of the consumer, independently of the electricity meter.

The patent application WO 03084022 describes a method and a system of regulating the electrical consumption of a set of consumers, consisting in measuring in real time the electrical consumption by means of a module situated in the home of each consumer monitoring the power supply circuits of the equipment. The modules of the consumer transmit the measurements to a central server which can selectively cut the electrical power supply to the equipment. This system makes it possible to regulate the consumption by clipping the consumption peaks. However, it does not make it possible to ensure the permanent balance of consumption in order to adapt the consumption to the level of production.

OBJECTS AND SUMMARY:

To meet these needs, the invention proposes a method making it possible to manage and modulate in real time the electrical consumption of a large number of consumers, taking into account, at a given moment, the needs and possibilities of each of them in order to constantly ensure the balance between electrical production and consumption.

To this end, according to a first aspect, the invention proposes a method of managing and modulating in real time the electrical consumption of a set of consumers, which comprises the following steps:
 a) real time and continuous measurement of the electrical consumption of a plurality of targeted sets of electrical equipment in operation, each set of equipment being situated in the home of a consumer, the measurement of the consumption of such equipment being performed individually or overall by means of an electrical regulation module situated in the home of the consumer, each module being directly linked with the electrical power supply circuits of such equipment;
 b) "push" mode transmission by said modules of the consumption measurements to a central server programmed to read and analyze these data;
 c) continuous establishment of an individual consumption profile of each consumer to deduce therefrom an individual prediction of its consumption and the available capacities;
 d) establishment of a global setpoint as a function of the available capacities, at a given moment, indicating that a certain total power should be cancelled, and sending by said server, to certain of said modules selected according to the setpoint and the history of the modulations already occurring on each site, of the instruction to selectively and temporarily cut the electrical power supply to the electrical equipment with which it is linked;
 e) reception and execution by these modules of the instruction sent by said server.

The expression "direct link" between each module and an electrical power supply circuit should be understood to mean both a local or remote wired link and a wireless link, for example by means of infrared rays or radio waves. This link enables the module to control a relay placed on the electrical circuit, this relay being capable of cutting the electrical power supply to the targeted set concerned.

The function of the method according to the invention is therefore to remotely trigger the cutting of a targeted set of power supply circuits to electrical equipment in the home of numerous consumers, by means of a module installed in the home of the consumers concerned.

This set is targeted by collecting in real time and continuously the powers consumed by the equipment: the cut instructions can be distributed according to these observed powers, in order to meet a global setpoint at a given moment. In the case where the transmitted setpoint is to cancel a certain overall power, the circuits that are cut are determined to achieve this power.

The modules used in the method according to the invention therefore each handle several functions:
 they permanently measure the consumptions of each of the items of electrical equipment with which they are linked;
 they transmit these measurements in "push" mode to the central server which aggregates them, and continually establish an individual profile of the consumption of each consumer and can instruct interruptions;
 they receive and execute the instructions to temporarily interrupt certain of the electrical circuits to which they are linked.

These modules are consequently devices for measuring, retaining and transmitting data, but also receiving and acting, in as much as they can effect selective cuts, that is cut the electrical power supply to a targeted part of the electrical installation of the consumers concerned.

The server of the invention comprises means for handling the recording and processing of the data received from the modules, and for feeding a module based on ongoing learning making it possible to continuously establish a consumption profile of each consumer and deduce therefrom a prediction of the future consumption and, consequently, of the available resources. It is then possible, thanks to the means of transmission between the server and the modules, to act selectively in real time on certain modules to adapt the consumption to the available production.

The method according to the invention also makes it possible to advantageously provide for the updating and/or modification of the program of at least one of the electrical regulation modules from the central server, by downloading files and software.

According to a preferred embodiment, each electrical regulation module operates in a stand-alone manner relative to the other modules and relative to the other elements of the electrical installation of the site, notably the other monitoring or measuring devices that are installed there. The term "stand-alone" therefore here means notably that each module operates independently of the other modules.

Each module used in the method according to the invention can be formed of one or several elements. When the module is in a single element, it presents the advantage of being compact and easy to install. However, depending on circumstances, it may, on the contrary be advantageous to provide a module comprising several elements each presenting different functionalities.

The transmission of the data from the modules to the central server is performed by means of wired (PSTN) or wireless (such as GSM) switched networks, or preferably by packet data transmission according to the IP protocol over wired networks, such as ADSL, or wireless networks such as GPRS. This transmission mode presents the advantage not only of making it possible to monitor a large number of modules, when the switching of the circuits would cause congestions, but also to be able to manage a large number of modules at a reasonable cost.

The method according to the invention can also incorporate the measurement data complementing the electrical consumption of the targeted sets of electrical equipment, or of all or part of the electrical installation of the consumer, said measurement being performed by measuring devices other than the electrical regulation module and with which a link to the latter is established. These complementary data are, for example, intended to enable the data transmitted directly by the electrical regulation modules to be verified or validated.

According to a second aspect, the subject of the invention is a system of managing and modulating in real time the electrical consumption of a set of consumers, which comprises:

a plurality of electrical regulation modules, each module being directly linked, continuously, with the electrical power supply circuits of electrical equipment forming part of a targeted set, said targeted set of electrical equipment and said module being located in the home of a consumer, said module being programmed to measure and retain the electrical consumption data of each targeted set in real time, transmit said data to a central server, receive and execute instructions from said server;

means of transmitting in push mode data from said modules to the central server;

a central server comprising means on the one hand for reading and analyzing the data transmitted by said modules and, on this basis, of establishing a consumption profile of each consumer, and on the other hand for transmitting to certain of said modules instructions to selectively and temporarily cut the electrical power supply to the electrical equipment with which they are linked, in order to satisfy a global setpoint, at a given moment, to cancel a certain total power;

means of transmitting instructions from the central server to said modules and;

means of selectively and temporarily cutting the electrical power supply to the electrical equipment.

For the reasons indicated above, it is advantageous for each electrical regulation module to function in a stand-alone manner relative to the other modules and relative to the other elements of the site's electrical installation.

The central server of the system according to the invention can comprises means of updating and/or modifying the program of each electrical regulation module.

Each electrical regulation module of the system according to the invention can be formed of one or several elements.

In the system according to the invention, the means of transmitting data from the modules to the central server are preferably wired (PSTN) or wireless (such as GSM) switched networks, or means of packet data transmission according to the IP protocol over wired networks, such as ADSL, or wireless networks such as GPRS.

The system according to the invention can also comprise measuring devices able to supply measurement data complementing the electrical consumption of the targeted sets of electrical equipment or of all or part of the electrical installation of the consumer, said devices being different from the electrical regulation modules and each device being linked with one of said modules.

The system according to the invention presents the advantage of offering the electricity producers adjustment and balancing capabilities making it possible to adapt to the electricity market, notably in Europe. In practice, these capabilities constitute a resource that is the subject of a regulated market, managed by the transport system operators (TSO). These markets operate by anticipation, typically on the day for-the next day, and the players that have adjustment capabilities present them to the operator (TSO) and detail their scope, that is, the electrical power that can be modulated for each hour or half-hour of the next day. The operator then, uses these capabilities if necessary to constantly balance the adjustment and consumption.

It also makes it possible to manage the distribution of consumption interruptions over a large number of modules in a rotating manner so as to limit the inconveniencies of the power cut for each consumer.

BRIEF DESCRIPTION OF THE DRAWINGS:

Other objects and advantages of the invention will become apparent from the description that follows, given with reference to the appended drawings in which.

DETAILED DESCRIPTION OF THE DRAWINGS

Figure 1:
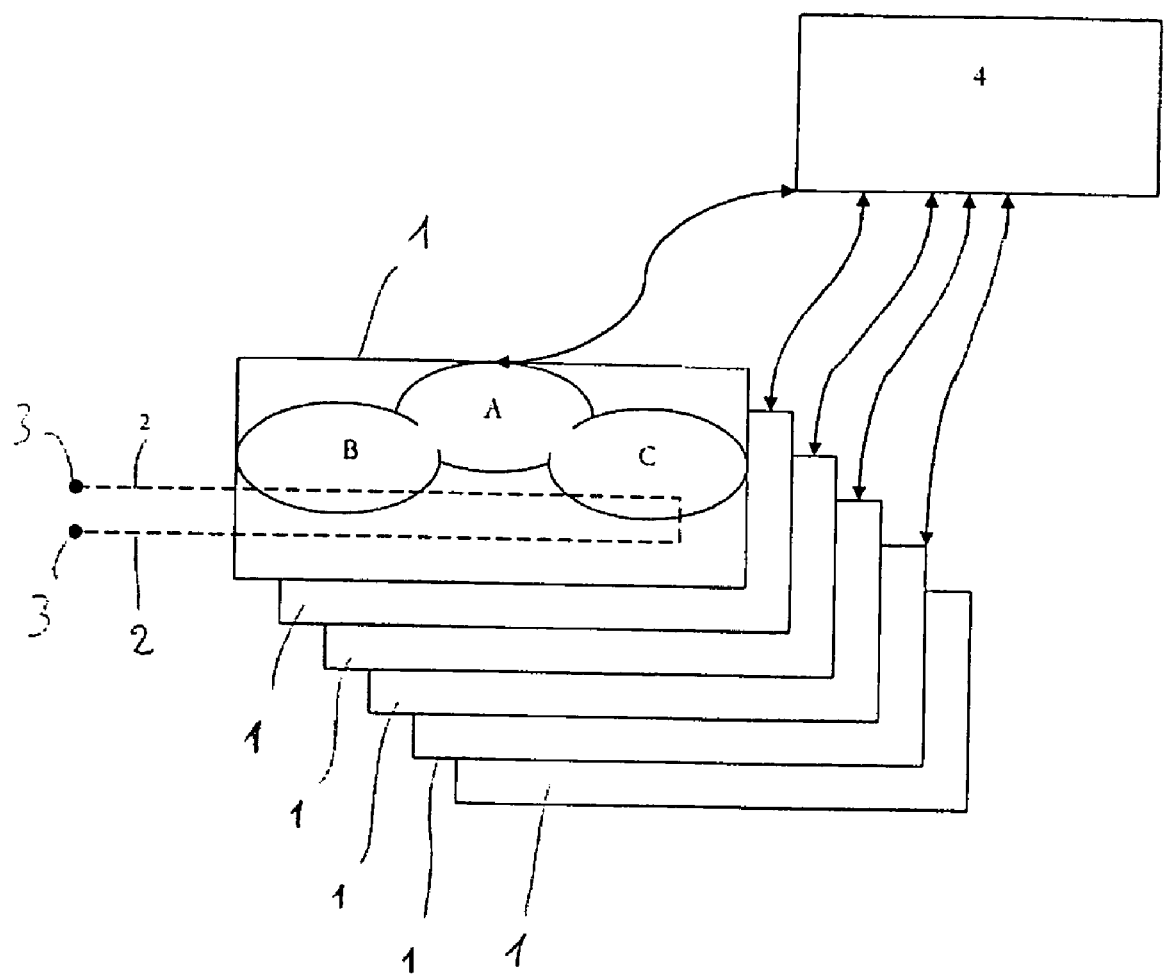
FIG. 1 is a diagrammatic representation of all of the system making it possible to implement the method according to the invention.

The system according to the invention, represented in FIG. 1, relies on an electrical regulation module 1 installed in the home of the consumer. This module 1 is installed in the private part of the electrical installation of each consumer, that is, downstream and independent of the electricity meter. The module 1 is connected to a selection of electrical circuits 2 powering the targeted equipment 3 in the home of the consumer.

Figure 2:
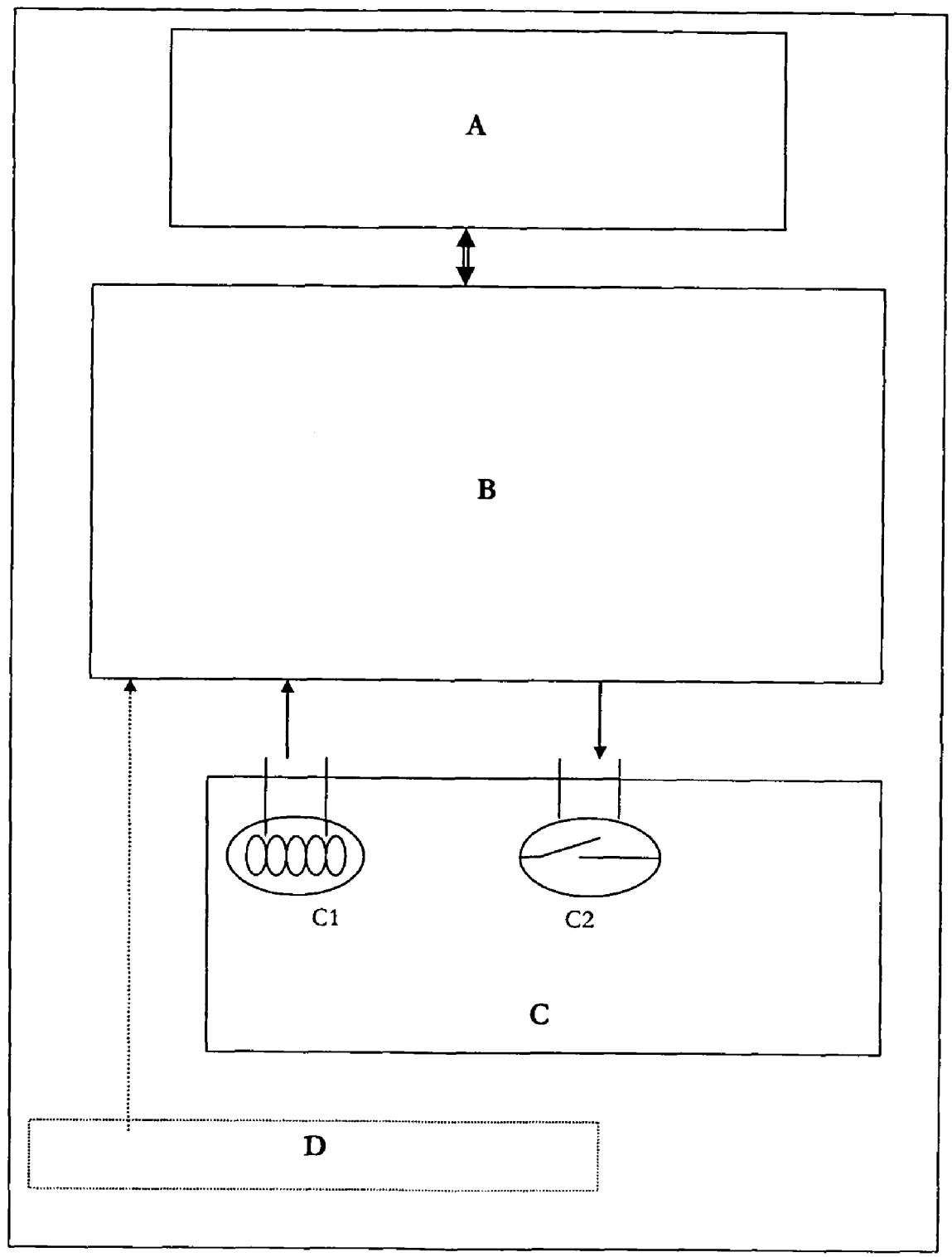
FIG. 2 is a diagrammatic representation of the various elements or modules that can constitute an electrical regulation module that can be used in the method according to the invention.

Each module handles three functions, which can, depending on the embodiment represented, be implemented by three distinct modules A, B and C, diagrammatically represented in FIGS. 1 and 2.

Module A corresponds to the telecommunications module, which consists of a GPRS modem and its antenna (built-in or remote), or of a link to an ADSL modem (by Wi-Fi, DECT, CPL or other).

The module B corresponds to the data processing module, in particular for collecting, retaining measurement data and interrupting electrical supplies. These functions are implemented by means of a PC running in Linux provided with a flash memory card, and data acquisition management software, controlling the storage of the data and their transmission to the telecommunications module A.

The software is also capable of receiving, via the telecommunications module A, instructions from the central server causing it to:
send the data;
update the data acquisition and processing parameters on the basis of which it works;
trigger the electrical circuit monitoring modules;
keep a log of the instructions received, and;
acknowledge their receipt to the central server.

The module C is the electrical monitoring module, making it possible to measure and interrupt the power supply. It comprises a measuring device C1, for example an induction loop, and an electrical relay C2 via which any cut-off instructions are transmitted.

The system represented also comprises an external measurement data acquisition module D.

The system comprises a large number of such modules, operated together remotely from a centralized aggregation and control platform 4.

Controlled in this way, the modules 1 therefore make it possible to supply not only exact information, but also a bidirectional communication channel and an on-demand curtailment capability.

The invention claimed is:

1. A method of managing and modulating in real time the electrical consumption of a set of consumers, said method comprising the steps of:
  a) measuring continuously and in real time the electrical consumption of a plurality of targeted sets of electrical equipment in operation, each set of equipment being situated in the home of a consumer, the measurement of the electrical consumption of such equipment being performed individually or overall by means of an electrical regulation module situated in the home of the consumer, each module being directly linked with the electrical power supply circuits of such equipment;
  b) transmitting in "push" mode by said modules of the electrical consumption measurements to a central server programmed to read and analyze these data;
  c) establishing continuously, based on the transmitted electrical consumption measurements, an individual consumption profile of each consumer to deduce therefrom an individual prediction of said each consumer's consumption and the available capacities;
  d) establishing a global setpoint as a function of said available curtailment capacities, at a given moment, indicating to cancel a certain total power, and sending by said server, to certain of said modules selected according to said global setpoint and the history of the modulations already occurring on each site, of the instruction to selectively and temporarily cut the electrical power supply to the electrical equipment with which the selected modules are linked; and
  e) receiving and executing, by these modules, of the instruction sent by said server.

2. The method as claimed in claim 1, further comprising the step of modifying the program of at least one of the electrical regulation modules from the central server.

3. The method as claimed in claim 1, wherein each electrical regulation module operates in a stand-alone manner relative to the other modules and relative to the other elements of the electrical installation of the site.

4. The method as claimed in claim 1, wherein the transmission of the data from the modules to the central server is performed by means of wired or wireless switched networks, or by packet data transmission according to the IP protocol over wired or wireless networks.

5. The method as claimed in claim 1, further comprising the step of incorporating measurement data complementing the electrical consumption of the targeted sets of electrical equipment, or of all or part of the electrical equipment of the consumer, said measurement being performed by measuring devices other than the electrical regulation module and with which a link to the latter is established.

6. A system for managing and modulating in real time the electrical consumption of a set of consumers, said system comprising:
  a central server;
  a plurality of electrical regulation modules, each module being directly linked, continuously, with the electrical power supply circuits of electrical equipment forming part of a targeted set, said targeted set of electrical equipment and said module being located in the home of a consumer, said module being programmed to measure and retain the electrical consumption data of each targeted set in real time, transmit said data to said central server, receive and execute instructions from said central server;
  means for transmitting in push mode said electrical consumption data from said modules to the central server;
  said central server comprising means for reading and analyzing the data transmitted by said modules, means for establishing continuously, based on the transmitted electrical consumption data, an individual consumption profile of each consumer to deduce therefrom an individual prediction of said each consumer's consumption and the available capacities, means for transmitting to certain of said modules instructions to selectively and temporarily cut the electrical power supply to the electrical equipment with which they are linked, in order to satisfy a global setpoint, at a given moment, to cancel a certain total power, wherein said global setpoint is established as a function of said available capacities and said modules are selected according to said global setpoint and the history of the modulations already occurring on each site;
  means for transmitting instructions from the central server to said modules; and
  means for selectively and temporarily cutting the electrical power supply to the electrical equipment.

7. The system as claimed in claim 6, wherein the central server comprises means for modifying the program of each electrical regulation module.

8. The system as claimed in claim 6, wherein each electrical regulation module is formed of one or several elements.

9. The system as claimed in claim 6, wherein the means of transmitting data from the modules to the central server are wired or wireless switched networks, or means of packet data transmission over wired or wireless networks.

10. The system as claimed in claim 6, further comprising measuring devices able to supply measurement data complementing the electrical consumption of the targeted sets of electrical equipment or of all or part of the electrical installation of the consumer, said devices being different from the electrical regulation modules and each device being linked with one of said modules.

* * * * *